US008136645B2

(12) United States Patent
Kobayashi et al.

(10) Patent No.: US 8,136,645 B2
(45) Date of Patent: Mar. 20, 2012

(54) ROTARY DAMPER

(75) Inventors: Masahiro Kobayashi, Tokyo (JP);
Naotoshi Saito, Tokyo (JP); Kiyoshi Chikashige, Tokyo (JP)

(73) Assignee: Advanex Inc., Tokyo (JP)

( * ) Notice: Subject to any disclaimer, the term of this patent is extended or adjusted under 35 U.S.C. 154(b) by 598 days.

(21) Appl. No.: 12/323,160

(22) Filed: Nov. 25, 2008

(65) Prior Publication Data

US 2009/0139810 A1  Jun. 4, 2009

(30) Foreign Application Priority Data

Nov. 29, 2007  (JP) ................. 2007-308822

(51) Int. Cl.
*F16D 57/00* (2006.01)
(52) U.S. Cl. ....................... 188/290; 188/381
(58) Field of Classification Search .......... 188/290, 188/381; 277/607, 616, 630, 637, 640; 464/180
See application file for complete search history.

(56) References Cited

U.S. PATENT DOCUMENTS 5,984,057 A * 11/1999 Nash .............................. 188/290

FOREIGN PATENT DOCUMENTS

| JP | 4-19927 | 2/1992 |
| JP | 10-002366 | 1/1998 |
| JP | 2002-266921 | 9/2002 |
| JP | 2007-154990 | 6/2007 |
| JP | 2007-232126 | 9/2007 |
| JP | 2007-270900 | 10/2007 |
| JP | 2007-298089 | 11/2007 |
| JP | 2008-095948 | 4/2008 |
| JP | 2005-114154 | 11/2008 |
| JP | 2008-281206 | 11/2008 |
| WO | 2007/066527 | 6/2007 |
| WO | 2008/032650 | 3/2008 |

OTHER PUBLICATIONS

Japanese Patent Office, Notice of Allowance with English Translation, issued in connection with Japanese Application No. 2007-308822, mailed on Sep. 20, 2011. (6 pages).

* cited by examiner

*Primary Examiner* — Bradley King
*Assistant Examiner* — Nicholas J Lane
(74) *Attorney, Agent, or Firm* — K&L Gates LLP

(57) ABSTRACT

A rotary damper is provided and includes: a housing; an annular ring member that is provided in the housing, and is made of elastomer or flexible rubber; a shaft body that is accommodated in a rotatable manner in the housing; and a sliding portion that is provided in the housing and makes contact with the ring member so as to freely slide with respect to the ring member along the circumferential direction thereof, in which: the ring member has an abutting portion that abuts the sliding portion, and a hollow portion provided inside the ring member; the hollow portion has an opening portion on the side opposite to the abutting portion; in the state of having enclosed gas in the hollow portion, the opening portion is hermetically joined to the inner surface of the housing; a projected portion that engages with the opening portion of the hollow portion is provided on the inner surface of the housing; and a pressing member that presses the ring member toward the inner surface of the housing is provided on the inner side and/or outer side of the ring member in the radial direction.

5 Claims, 4 Drawing Sheets

ROTARY DAMPER

CROSS REFERENCE TO RELATED APPLICATIONS

The present application claims priority to Japanese Patent Application No. 2007-308822, filed Nov. 29, 2007, the entire contents of which is being incorporated herein by reference.

BACKGROUND

A rotary damper is conventionally known as a damper that is used for example in various opening and closing mechanisms to impart torque to the opening and closing action of an opening and closing member. As this kind of rotary damper, there is known a mechanism that uses a viscous fluid, such as oil.

In a rotary damper with a mechanism that uses this viscous fluid, the damper function by the imparting of torque is basically constant. Accordingly, it is suitably used for a configuration that brakes the opening and closing action of an opening and closing member or the like with a constant force. Also, as a rotary damper of a mechanism that uses this kind of viscous fluid, for example, there is known a damper that uses silicon oil as the viscous fluid. In this kind of rotary damper, in order to prevent oil leakage (fluid leakage), a sealing member such as an O-ring is provided (for example, refer to Japanese Unexamined Patent Application, First Publication No. 2005-114154).

However, in a rotary damper that employs a viscous fluid such as the aforementioned silicon oil, since the viscosity of the viscous fluid depends on temperature, the damper function also changes with temperature. In particular, when the temperature rises to 40° C. or higher, that change becomes large. Accordingly, in the case of being applied to a configuration in which it is desired to brake with a constant force, that is, with a constant damper function, regardless of temperature, problems arise even in a rotary damper that uses this kind of viscous fluid.

Also, in a rotary damper that uses a viscous fluid, since a sealing member for preventing oil leakage (fluid leakage) is needed as mentioned above, the configuration becomes complicated. Also, since a step for filling the viscous fluid is required, the assemblability is poor, and the productivity is adversely affected.

Therefore, the inventors of the present application proposed a rotary damper that uses an annular ring member made of elastomer or flexible rubber and a sliding portion that slides along the circumferential direction thereof without using a viscous fluid, and so exhibits a constant damper function by the frictional force due to the sliding (refer to Japanese Unexamined Patent Application, First Publication No. 2007-154990).

However, even in the rotary damper disclosed in Japanese Unexamined Patent Application, First Publication No. 2007-154990, there are the following issues that need to be improved.

Although rotary dampers differ depending on their use, for example, in the case of being actuated when a lid or door is opened, a rotary damper with a high rotational speed dependency is often required. That is, when a lid or a door is opened, an inertia force and the like acts in the latter period compared with the initial period or middle period, and the opening speed increases. As a result, there is the possibility of an excessive load acting on the attachment portion of the lid or door, and defects occurring such as a loud noise being made as a result of impact. In the rotary damper disclosed in Japanese Unexamined Patent Application, First Publication No. 2007-154990, the rotational speed dependency is comparatively low, and so is insufficient for meeting the performance required in the applications described above.

Also, in relation to temperature dependency, in the rotary damper disclosed in Japanese Unexamined Patent Application, First Publication No. 2007-154990, the torque variation rate is small compared to a rotary damper that uses a viscous fluid from room temperature to about 40° C., and it exhibits a constant damper function. However, when the temperature becomes higher than 40° C., the torque variation rate becomes comparatively large.

SUMMARY

The present application was achieved in view of the aforementioned circumstances, and has as its object to provide a rotary damper in which the rotational speed dependency is comparatively high, and the temperature dependency is comparatively small even at temperatures of 40° C. or higher, and accordingly exhibits a nearly constant damper function even at high temperatures of 40° C. or higher.

In an embodiment, a rotary damper includes: a housing; an annular ring member that is provided in the housing and is made of elastomer or flexible rubber; a shaft body that is accommodated in a rotatable manner in the housing; and a sliding portion that is provided in the housing and makes contact with the ring member so as to freely slide with respect to the ring member along the circumferential direction thereof, in which: the ring member has an abutting portion that abuts the sliding portion and a hollow portion provided inside the ring member; the hollow portion has an opening portion on the side opposite to the abutting portion; in the state of having enclosed gas in the hollow portion, the opening portion is hermetically joined to the inner surface of the housing; a projected portion that engages with the opening portion of the hollow portion is provided on the inner surface of the housing; and a pressing member that presses the ring member toward the inner surface of the housing is provided on the inner side and/or outer side of the ring member in the radial direction.

According to this rotary damper, when the shaft body is rotated with respect to the housing, friction is produced by the sliding of the sliding portion with respect to the abutting portion of the ring member, thereby generating torque in the shaft body and exhibiting a damper function. At this time, since air is enclosed in the hollow portion of the ring member, a repulsive force generated by an elastic return force that accompanies the elastic deformation and a constant internal pressure that is produced by the gas of the hollow portion is imparted uniformly to the abutting portion. Thereby, the frictional force due to the sliding between the sliding portion and the abutting portion becomes constant over the entire circumference of the ring member, and accordingly a comparatively constant damper function is exhibited.

Also, since gas such as air is enclosed in the ring member, there is no inconvenience such as fouling other members even if it leaks. Accordingly, a sealing member becomes unnecessary, and a process of injecting a viscous fluid such as oil becomes unnecessary.

Also, a projected portion that engages with the opening portion of the hollow portion of the ring member is provided on the inner surface of the housing, and a pressing member that presses the ring member toward the inner surface of the housing is provided on the inner side and/or outer side of the ring member in the radial direction. Thereby, even if the relative turning (rotation) speed of the shaft body with respect to the housing increases, the ring member is prevented from turning (rotating) by co-rotating with the rotation (sliding) of the sliding portion. Accordingly, the torque that is generated in the shaft body increases as the rotational speed becomes faster, and the rotational speed dependency of the torque becomes comparatively high.

Also, since the opening portion of the hollow portion of the ring member engages with the projected portion, and a pressing member is provided on the inner side and/or outer side of the ring member in the radial direction, even if the usage environment becomes a temperature of 40° C. or higher such that the air in the hollow portion undergoes volumetric expansion, the degree of leakage to the outside of the hollow portion is suppressed to a low level. When the temperature becomes 40° C. or higher, the hardness of the ring member made of elastomer or soft rubber softens slightly, and accordingly the frictional force between the ring member and the sliding portion decreases.

However, the internal pressure of the ring member increases by the volumetric expansion of the air in the hollow portion as described above. Therefore, since the decrease in the frictional force due to the softening of the ring member and the increase in the internal pressure of the ring member are mutually offset, the torque that is generated in the shaft body hardly changes. Accordingly, even at high temperatures of 40° C. or higher, the temperature dependency is comparatively low.

In the rotary damper, it is preferable that the pressing members be provided on both the inner side and outer side of the ring member in the radial direction.

By adopting this constitution, the turning (rotating) of the ring member by co-rotating with the rotation (sliding) of the sliding portion is more favorably prevented, and the degree to which the air leaks to the outside of the hollow portion when the air in the hollow portion undergoes volumetric expansion is suppressed to a lower level.

In the rotary damper, it is preferable that a portion of the shaft body project from the housing.

By adopting this constitution, it is possible to easily couple the rotary damper to various opening and closing mechanisms via a gear or cam or the like by attaching the gear or cam or the like to the portion that projects from the housing. In the rotary damper, it is preferable that the sliding portion be formed in an annular shape or a disc shape so as to abut the abutting portion of the ring member at the entire circumference thereof.

By adopting this constitution, as a result of the sliding portion abutting the abutting portion of the ring member at the entire circumference thereof, the frictional force that is produced therebetween becomes large so that the damper function increases. Also, because the contact area between the sliding portion and the abutting portion of the ring member is always constant, and the sliding is continuous over the entire circumference of the abutting portion, the damper function that is due to the rotation of the shaft body is more stable and is exhibited in a constant manner.

In the rotary damper, it is preferable that the sliding portion be formed in a disc shape so as to abut the abutting portion of the ring member at the entire circumference thereof and be integrally formed with the shaft body, and that, on the side opposite to the side where the sliding portion abuts the abutting portion of the ring member, the ring member abut the inner surface of the housing in a slidable and air-tight manner, and a space within the housing to the outer side of the abutting location between the sliding portion and the inner surface of the housing in the housing be constituted in an airtight manner by the sliding portion and the housing.

By adopting this constitution, even if the gas that is enclosed in the hollow portion of the ring member is assumed to leak to the outside of the ring member, since the space in the housing that includes this ring member is constituted in an airtight manner by the sliding portion abutting the inner surface of the housing in an airtight manner, leakage of the gas to the outside of the ring member is suppressed.

According to the rotary damper, since a comparatively constant damper function is exhibited as described above, it is suited to a configuration particularly where it is desired to perform braking with a nearly constant force, that is, a nearly constant damper function.

Also, since only a gas such as air is used as the fluid without using a viscous fluid such as oil, a sealing member becomes unnecessary, and a process of injecting a viscous fluid becomes unnecessary. Accordingly, it is possible to substantially improve productivity compared to before.

Also, since the opening portion of the hollow portion of the ring member engages with the projected portion, and the pressing member is provided on the inner side and/or outer side of the ring member in the radial direction, the rotational speed dependency of the torque is comparatively high. Therefore, it is suitably used in applications where a comparatively high rotational speed dependency is required.

Also, since the temperature dependency is comparatively small even at high temperatures of 40° C. or higher, it is suitably used in applications where a nearly constant damper function is required even at high temperatures of 40° C. or higher.

Additional features and advantages are described herein, and will be apparent from the following Detailed Description and the figures.

DETAILED DESCRIPTION

Figure 1A:
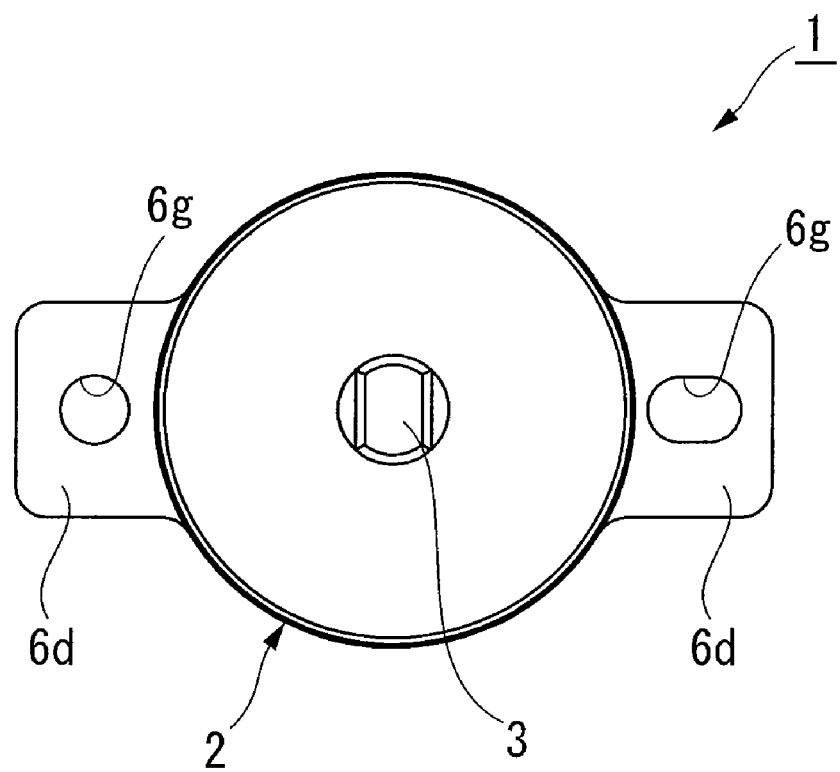
FIG. 1A is a plan view that shows an outline constitution of one embodiment of a rotary damper.
Figure 1B:
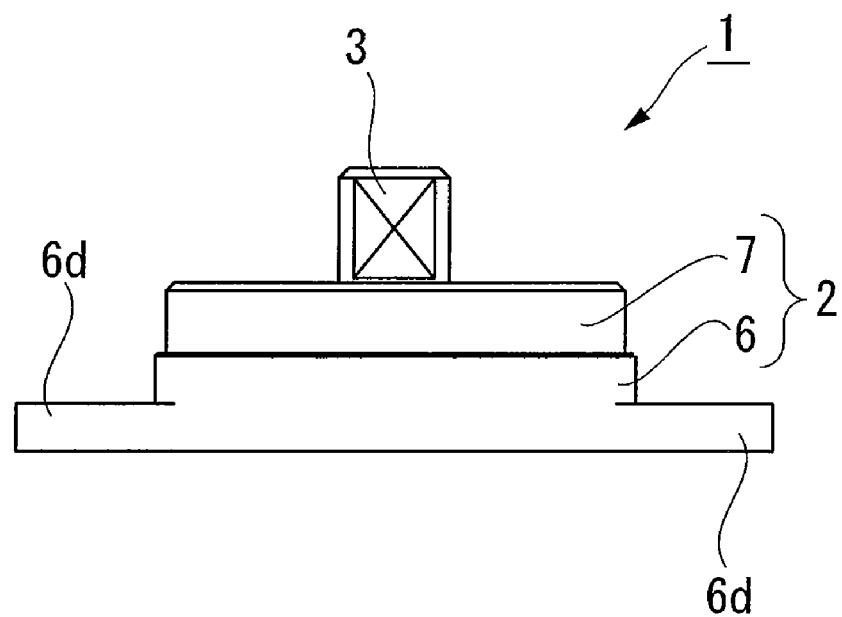
FIG. 1B is a side view that shows the outline constitution of one embodiment of the rotary damper.
Figure 2:
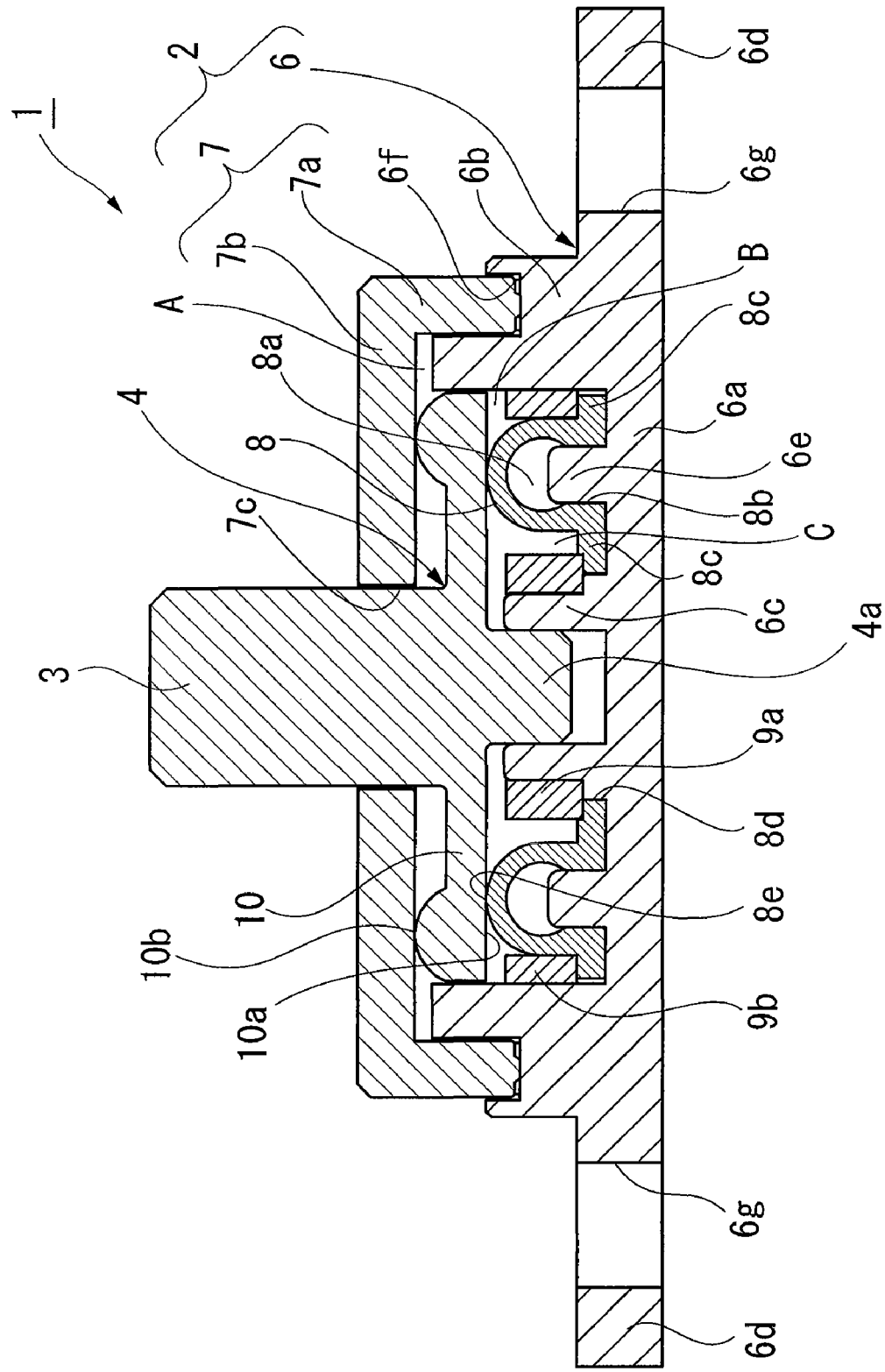
FIG. 2 is a side sectional view of the rotary damper shown in FIG. 1A and FIG. 1B.

FIG. 1A, FIG. 1B, and FIG. 2 are drawings that show one embodiment of a rotary damper. FIG. 1A is a plan view of a rotary damper, FIG. 1B is a side view of the rotary damper, and FIG. 2 is a sectional side view of the rotary damper. A rotary damper 1 that is shown in FIG. 1A, FIG. 1B, and FIG. 2 is used in the opening and closing mechanism of various doors, the opening and closing mechanism of various covers, the opening and closing mechanism in the opening and closing door of various audio devices, the opening and closing mechanism of toilet seats, and the like. The rotary damper 1 is constituted to impart a nearly constant torque with respect to the opening and closing action of the opening and closing member, exhibit a constant damper function, and have a comparatively high rotational speed dependency.

The rotary damper 1 is provided with a housing 2 and a shaft member 4 that is housed in a rotatable manner in the housing 2 and has a shaft body 3 with a portion thereof projecting outward from the inside of the housing 2 (refer to FIG. 2). The housing 2 is provided, for example, on a fixing portion (main body side) of the opening and closing mechanism. A gear or cam for braking a moving portion (following portion) of the opening and closing mechanism is attached to the portion of the shaft body 3 of the shaft member 4 that projects from the housing 2. Generally, a rack or gear or the like is provided in an opening and closing member of a door or the like that serves as the moving portion, and the gear or cam or the like that is provided in the shaft body 3 meshes with the rack or gear or the like of the opening and closing member, whereby the opening and closing action of the opening and closing member is controlled.

In this housing 2, as shown in FIG. 2, an annular ring member 8 is formed. Here, the housing 2 includes a housing body 6 and a cover 7 that integrally engages with this housing body 6. The housing 2 is formed from a hard synthetic resin or the like. The housing body 6 includes a bottom plate 6a, an engaging cylinder portion 6b with a cylindrical shape that is integrally formed on one surface (inner surface) of this bottom plate 6a, a cylindrical bearing portion 6c that is integrally formed on the base plate 6a in the center of the base plate 6a, and a pair of attachment portions 6d, 6d that are formed in the side portions of the bottom plate 6a in the state of overhanging.

As shown in FIG. 2, an annular projected portion 6e is formed on the one surface (inner surface) of the bottom plate 6a. This projected portion 6e engages with an opening portion 8b of a hollow portion 8a of a ring member 8 (described below), thereby preventing this ring member 8 from rotating and increasing the airtightness within the hollow portion 8a.

In the engaging cylinder portion 6b, an engaging groove 6f is formed along the circumferential direction on the upper surface thereof, and a cylindrical portion 7a of the cover 7 engages with this engaging groove 6f as described below.

A concave portion in the center of the bearing portion 6c rotatably engages with an engaging projection portion 4a of the shaft member 4 as described below.

An attachment hole 6g is formed in each attachment portion 6d as shown in FIG. 1. A screw or the like is fitted into this attachment hole 6g, whereby the housing body 2 is attached and fixed to a fixing portion or the like in the opening and closing mechanism.

As shown in FIG. 2, the cover 7 has a covered cylindrical shape, and a lower edge portion of the cylindrical portion 7a thereof engages with the engaging groove 6f of the engaging cylinder portion 6b of the housing body 6. The lower edge portion of the cylindrical portion 7a is welded or adhered to the engaging groove 6f such that this cover 7 is fixed to the housing body 6. With this constitution, a housing space is formed in the interior of the housing 2. Also, in the cover 7, a circular opening portion 7c is formed in the center portion of a lid 7b.

In the housing 2, that is, in the housing space thereof, the annular ring member 8 is provided. The ring member 8 is made of a soft synthetic resin (elastomer) or soft rubber such as silicon rubber, and is formed to be elastically deformable. Here, in order to suppress the passage of gas (air) through the ring member 8 itself, a coating of fluroresin or a metal or the like may be made on the inner surface and/or outer surface of the ring member 8.

This ring member 8 has an annular shape resembling a tire shape or inner tube shape. A hollow portion 8a is provided inside the ring member 8 along the circumferential direction, and an opening portion 8b is formed in the circular direction on one side (the side of the bottom plate 6a) of the ring member 8. A flange portions 8c are formed on both sides (outer side and inner side in the radial direction) of the opening portion 8b in the ring member 8, and an inward hole 8d is formed on the inner side of the flange portion 8c in the radial direction, that is, at the inner portion of the flange portion 8c positioned more inner side than the opening portion 8b. The upper surface portion of the ring member 8 serves as an abutting portion 8e that abuts a sliding surface 10a of a sliding portion 10 (described below).

The flange portion 8c of the ring member 8 abuts the bottom plate 6a of the housing body 6, and thereby the projected portion 6e fits into the opening portion 8b, and engages with the opening portion 8b of the hollow portion 8a. The side end surface of the inner-side flange portion 8c that forms the inward hole 8d is made to abut the bearing portion 6c in the cohesive state, and the side end surface of the outer-side flange portion 8c is made to abut the inner surface of the engaging cylinder portion 6b in the cohesive state.

Also, pressing members 9a, 9b that press the ring member 8 against the bottom plate 6a side (inner surface side) of the housing 6 are provided on the upper side of the flange portions 8c of the ring member 8. The pressing members 9a, 9b have a cylindrical shape and, in the present embodiment, are disposed on both sides (the inner side and the outer side in the radial direction) of the ring member 8. The pressing member 9a that is disposed on the inner side is disposed so as to press the flange portion 8c in a state in which the flange portion 8c is fitted on the outside of the bearing portion 6c. The pressing member 9b that is disposed on the outer side is disposed so as to press the flange portion 8c in a state in which the flange portion 8c is fitted on the inside of the engaging cylinder portion 6b.

In the ring member 8 that is constituted in this way, the bottom surface of both flange portions 8c abuts the inner surface of the bottom plate 6a and is closely attached thereto, the projected portion 6e engages with the opening portion 8b of the hollow portion 8a, and moreover, in that state, the ring member 8 is retained and fixed by the pressing members 9a, 9b. Thereby, it is possible to hermetically seal air in the hollow portion 8a. Since the projected portion 6e engages with the opening portion 8b of the hollow portion 8a and, in that state, the ring member 8 is retained and fixed by the pressing members 9a, 9b, the ring member 8 is prevented from turning (rotating) in the circumferential direction by co-rotating with the rotation (sliding) of the sliding portion of the shaft member 4 as described below. Also, the degree to which the air that is sealed in the hollow portion 8a leaks to the outside of the ring member 8 is suppressed to a low level.

Figure 3A:
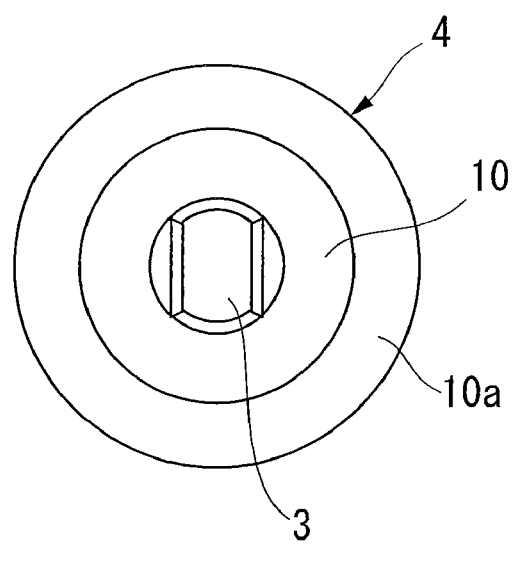
FIG. 3A is a plan view that shows a shaft member.
Figure 3C:
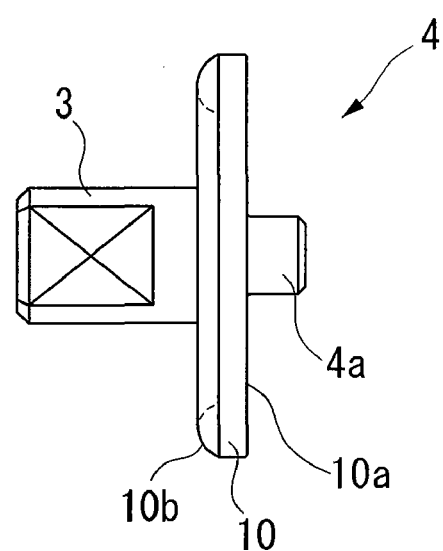
FIG. 3C is a front view that shows the shaft member.
Figure 3B:
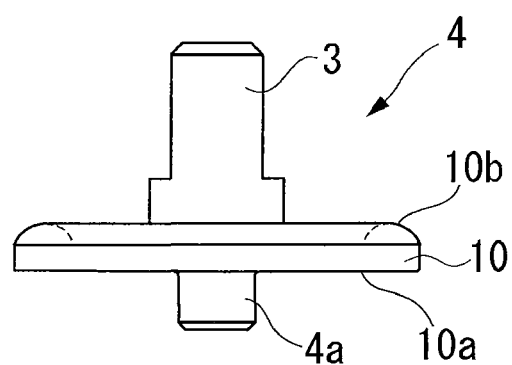
FIG. 3B is a side view that shows the shaft member.

As described above, the shaft member 4 is provided in the housing 2, that is, in the housing space thereof. This shaft member 4 is formed by a synthetic resin or synthetic rubber or the like. The shaft member 4 is integrally formed by the shaft body 3, the sliding portion 10 that abuts in a slidable manner with respect to the ring member 8, and the engaging projection portion 4a that engages in a rotatable manner with the bearing portion 6c. The sliding portion 10 is disc-shaped as shown in FIG. 3A to FIG. 3C, and the shaft body 3 is integrally formed on the center portion of one side (the upper side) thereof, while the engaging projection portion 4a is integrally formed on the center portion of the other side (the lower side) thereof. In this sliding portion 10, the surface on which the engaging projection portion 4a is formed serves as the sliding surface 10a that abuts the ring member 8 in a slidable manner as shown in FIG. 2.

On the surface opposite to this sliding surface 10a, an annular bulging portion 10b is formed in the outer circumference side. This bulging portion 10b is formed so that the sectional side shape thereof is approximately semi-circular. The bulging portion 10*b* makes contact with the inner surface of the cover 7 in a slidable and air-tight manner. The bulging portion 10*b* that is constituted in this manner makes contact with the cover 7 in a manner approximating a line without making contact with a surface. Accordingly, when the shaft member 4 is rotated with respect to the housing 2 as described below, although friction arises by the bulging portion 10*b* sliding on the inner surface of the cover 7, the frictional resistance produced here is small.

Also, since the bulging portion 10*b* contacts the inner surface of the cover 7 in an airtight manner, a space within the housing 2 to the outer side of the abutting location between the bulging portion 10*b* and the inner surface of the cover 7, that is, the space including a space A among the cover 7, the engaging cylinder portion 6*b*, and the bulging portion 10*b*, a space B including the sliding surface 10*a*, the engaging cylinder portion 6*b*, the pressing member 9*b*, and the ring member 8, and a space C among the shaft member 4, the ring member 8, the pressing member 9*a*, and the bearing portion 6*c*, is constituted in an airtight manner by the sliding portion 10 and the housing 2. Accordingly, air does not come out from the space that is constituted in an airtight manner. Also, foreign objects or the like do not enter this airtight space from the opening portion 7*c* of the cover 7.

The shaft body 3 has a cylindrical shape, and the distal end side thereof projects to the outside from the opening portion 7*c* of the cover 7. As described above, a gear or cam or the like for braking the opening and closing member such as a door is attached to this projecting portion. An opening and closing member such as a door may be directly provided at the projecting portion without introducing a gear or cam or the like. That is, since the shape of the distal end portion of the shaft body 3 is formed in an I cut shape (or D cut shape) as shown in FIG. 3A to FIG. 3C, in either case of attaching a gear or cam or the like and of directly attaching the opening and closing member, force is transmitted without rotating idly. Note that, in order to prevent the rotation of the gear, cam, opening and closing member or the like, a through hole may be formed in the shaft body 3 and a member such as a pin may be inserted in this through hole.

The engaging projection portion 4*a* is a cylindrical shape that has the same center axis as the shaft body 3. By engaging the engaging projection portion 4*a* with the bearing portion 6 in a rotatable manner, the rotation of the shaft member 4 is stabilized.

The method of manufacturing the rotary damper 1 constituted in this manner is described hereinbelow. First, the flange portions 8*c* of the ring member 8 are abutted on the inner surface of the bottom plate 6*a* of the housing body 6, and the projected portion 6*e* of the bottom plate 6*a* is fitted into the opening portion 8*b* of the ring member 8. That is, the inward hole 8*d* of the ring member 8 is engaged on the bearing portion 6*c*, and the flange portions 8*c* are brought into contact with the bottom plate 6*a*, the bearing portion 6*c* and the engaging cylinder portion 6*b*. Then, in this state, the pressing members 9*a*, 9*b* are engaged at the predetermined locations and are pressed toward the bottom plate 6*a* such that the ring member 8 is pressed and joined to the bottom plate 6*a*.

Regarding the environment during assembly, assembly may be performed in an air atmosphere, and in this case, air is naturally sealed in the space that is formed between the ring member 8 and the projected portion 6*e* in the hollow portion 8*a* of the ring member 8. With the aim of reducing the moisture content in the air that is to be sealed, the moisture (humidity) in the atmosphere may be lowered during assembly. Also, with the aim of increasing the internal pressure by air (gas) after sealing, a foaming agent may be provided on the projected portion 6*e*. After joining the ring member 8 on the bottom plate 6*a*, the foaming agent may be made to foam by heating or the like in, for example, a final process to increase the internal pressure. An adhesive may be used to adhere the flange portions 8*c* to the bottom plate 6*a*, if necessary.

Next, the engaging projection portion 4*a* of the shaft member 4 is fitted into the bearing portion 6*c*, and the sliding portion 10 of the shaft member 4 is placed on the ring member 8 such that the sliding surface 10*a* is made to contact the ring member 8. At that time, grease may be thinly applied between the sliding surface 10*a* and the ring member 8 so as to lubricate the sliding action, if necessary. Then, in that state, the cover 7 is put on the shaft member 4 while the distal end portion of the shaft body 3 is passed through the opening portion 7*c*. At that time as well, grease may be thinly applied as required between the bulging portion 10*b* of the sliding portion 10 and the inner surface of the cover 7 so as to lubricate the sliding action, if necessary.

In addition, the cover 7 is pushed toward the housing body 6, and the cylindrical portion 7*a* thereof is engaged with the engaging groove 6*f* of the engaging cylinder portion 6*b*. Then, the housing body 6 and the cover 7 are fixed to each other in an airtight manner by welding or adhesion.

In this way, the ring member 8, the pressing members 9*a*, 9*b*, and the shaft member 4 are housed in the housing 2 formed by the housing body 6 and the cover 7. The ring member 8 is pressed by the cover 7 via the sliding portion 10 of the shaft member 4, and by undergoing elastic deformation, the internal pressure thereof increases such that the ring member 8 comes to press the sliding portion 10 relatively.

Also, the bulging portion 10*b* and the inner surface of the cover 7 make contact with each other in an airtight manner. Thereby, the space within the housing 2 to the outside of the contact location between the bulging portion 10*b* and the inner surface of the cover 7, that is, the housing space on the side that forms the ring member 8, is formed in an airtight closed space by the sliding portion 10 and the housing 2.

Next, the action of the rotary damper 1 constituted in this manner will be described.

To use this rotary damper 1, first, the rotary damper 1 is attached to, for example, a main body side (fixing portion side) of an opening and closing device (opening and closing mechanism) by using the attachment portions 6*d*, 6*d* of the housing body 6. Then, a gear or cam is attached to the shaft body 3 that projects from the housing 2, and this gear or cam is meshed with a gear or the like that is provided in an opening and closing member of a door or the like.

When set in this manner, the opening and closing member of a door or the like is made to open and close. By doing so, following the opening and closing operation, the shaft body 3 of the rotary damper 1 rotates in the forward direction or reverse direction. That is, the shaft body 3 rotates in the forward direction or reverse direction with respect to the housing 2.

When the shaft body 3 is rotated in this manner, the sliding portion 10 slides with respect to the abutting portion 8*e* of the ring member 8, that is, the upper surface portion of the ring member 8, producing friction, and thereby generating torque in the shaft body 3 and exhibiting a damper function with respect to the opening and closing member. At this time, since air is enclosed in the hollow portion 8*a* of the ring member 8, a repulsive force generated by an elastic return force that accompanies the elastic deformation of the ring member 8 and a constant internal pressure that is produced by the internal gas is imparted uniformly to the abutting portion 8*e*. Thereby, the frictional force due to the sliding between the sliding portion 10 and the ring member 8 becomes constant over the entire circumference of the ring member 8.

Accordingly, with this rotary damper 1, since it is possible to exhibit a constant damper function, it is suited to the case where it is desired to brake an opening and closing member or the like with a comparatively constant force, that is, a constant damper function.

Also, since air (gas) is enclosed in the ring member 8, there is no inconvenience such as fouling other members even if it leaks. Accordingly, a sealing member becomes unnecessary, and a process of injecting a viscous fluid such as oil becomes unnecessary. Accordingly, it is possible to substantially improve productivity compared to before.

In particular the projected portion 6e engages with the opening portion 8b of the hollow portion 8a and, in this state, is retained and fixed by the pressing members 9a, 9b. Thereby, even if the relative turning (rotation) speed of the shaft member 4 (shaft body 3) with respect to the housing 2 increases, the ring member 8 is prevented from turning (rotating) in the circumferential direction by co-rotating with the rotation (sliding) of the sliding portion 10. Accordingly, the torque that is generated in the shaft body 3 increases as the rotational speed becomes faster, and the rotational speed dependency of the torque becomes comparatively high. Therefore, it is suitably used in applications where a comparatively high rotational speed dependency is required.

Also, even if the usage environment becomes a temperature of 40° C. or higher such that the air of the hollow portion 8a undergoes volumetric expansion, as described above the degree to which the air leaks to the outside of the hollow portion 8a is suppressed to a low level. Accordingly, the internal pressure of the ring member 8 increases by the volumetric expansion of the air of the hollow portion 8a, whereby the torque that is generated in the shaft body 3 will hardly change. As described in detail, when the temperature becomes 40° C. or higher, the hardness of the ring member 8 made of elastomer or soft rubber softens slightly, and accordingly the frictional force between the ring member 8 and the sliding portion 10 decreases. However, the internal pressure of the ring member 8 increases by the volumetric expansion of the air of the hollow portion 8a as described above. Therefore, since the decrease in the frictional force due to the softening of the ring member 8 and the increase in the internal pressure of the ring member 8 are mutually offset, the torque that is generated in the shaft body 3 hardly changes. Thereby, since the temperature dependency of this rotary damper 1 is comparatively low even at high temperatures of 40° C. or higher, it is suitably used in applications where a comparatively low temperature dependency is required at high temperatures.

Also, the pressing members 9a, 9b are provided at both sides (the inner side and the outer side in the radial direction) of the ring member 8. Thereby, it is possible to more favorably prevent the ring member 8 from turning (rotating) by co-rotating with the rotation (sliding) of the sliding portion 10, and it is possible to suppress to a lower level the degree to which the air leaks to the outside of the hollow portion 8a when the air of the hollow portion 8a undergoes volumetric expansion. However, for example, in the event of a temperature rising so as to exceed 50° C., the internal pressure of the ring member 8 may rise to an extreme, and so there may be a risk of the balance being disrupted between the rise in the internal pressure of the ring member 8 and the drop in the frictional force due to the softening of the ring member 8. In this case, instead of providing the pressing members 9a, 9b at both sides (the inner side and the outer side in the radial direction) of the ring member 8, the pressing member 9a (9b) may be provided at only one side so that the air in the hollow portion 8a slightly leaks when the internal pressure of the ring member 8 extremely rises.

Also, by having the bulging portion 10b and the inner surface of the cover 7 make airtightly contact, the space within the housing 2 to the outside of the contact location between the bulging portion 10b and the inner surface of the cover 7 is constituted to be air tight by the sliding portion 10 and the housing 2. Accordingly, it is possible to favorably suppress leakage of the air that is enclosed in the interior of the ring member 8 to the outside of the ring member 8, and thereby possible to cause a frictional force to be generated by the ring member 8 in a stable manner over a long period.

Note that various modifications can be made in a scope that does not depart from the spirit or scope of the present application. For example, although in the above embodiment, a portion of the shaft body 3 was made to project from the housing 2, an engaging portion made of a concave portion or through hole may be formed in the shaft body 3 along the center axis direction without projecting the shaft body 3 from the housing 2. By adopting such a constitution, it is possible to couple a gear or cam, or an opening and closing member such as a door to the engaging portion made of the concave portion or through hole via a shaft member or the like. When an opening and closing member or the like has a rotating shaft, it is possible to achieve a direct coupling.

Also, the sliding portion 10 is formed in the disc shape in the above embodiment. However, instead of this, the sliding portion may be formed in an annular shape and, moreover, it may be formed in a propeller shape that is provided with a plurality of wing-shaped blades, as long as the sliding portion abuts the ring member 8 so as to freely slide along the circumferential direction with respect to the ring member 8.

Moreover, the sliding portion and the shaft body may be separate parts, so that, by assembling them, the shaft member is formed.

Also, although the cylindrical portion 7a of the cover 7 is fixed to the engaging cylinder portion 6b of the housing body 6 by welding or adhering, screw portions may be formed in the cylindrical portion 7a and the engaging cylinder portion 6b, respectively, such that the cover 7 is fixed to the housing body 6 by screwing these screw portions.

Also, by performing both of screwing and the abovementioned welding or adhereing, the housing body 6 and the cover 7 may be more firmly fixed to each other.

EXAMPLE 1

The respective temperature characteristics (temperature dependencies) of the rotary damper (hereinbelow referred to as the present product), a conventional rotary damper as disclosed in Japanese Unexamined Patent Application, First Publication No. 2007-154990 (hereinbelow referred to as the conventional product), that is, a rotary damper with a constitution that basically eliminates the pressing members 9a, 9b and the projected portion 6e from the rotary damper 1 of the above embodiment, and a conventional damper that uses silicon oil as the viscous fluid (hereinbelow referred to as the oil damper) were investigated. The obtained results are presented in FIG. 4. Here, as the present product, a damper that is provided with only the inner-side pressing member 9a among the two pressing members 9a, 9b, without providing the outer-side pressing member 9b, was used.

Figure 4:
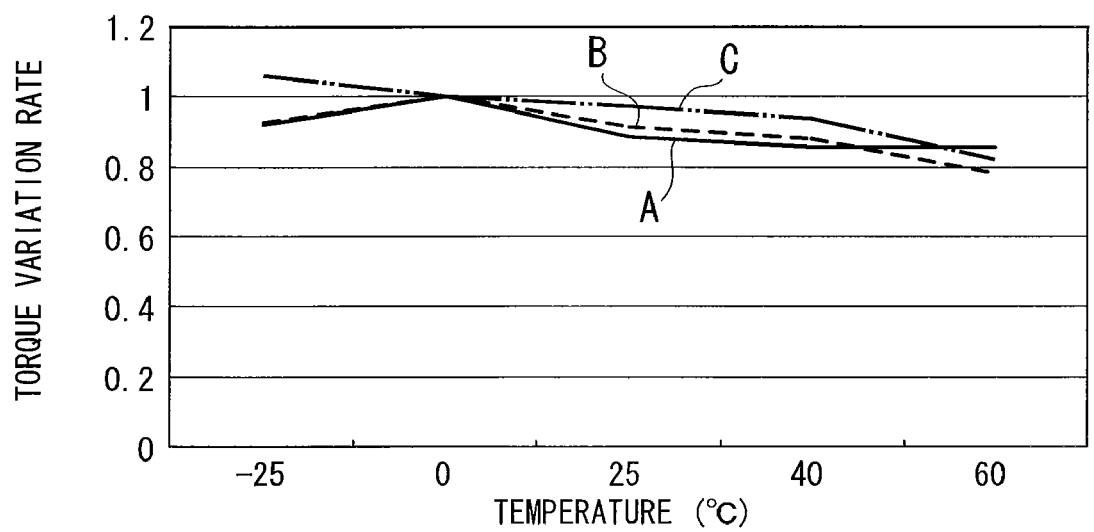
FIG. 4 is a graph that shows temperature characteristics (temperature dependencies).

Note that, in FIG. 4, the horizontal axis denotes the environment temperature, and the vertical axis shows the relative torque value as a torque variation rate with the torque value at 0° C. set as 1. Also, in FIG. 4, A represented by the solid line shows the temperature characteristic of the present product, B represented by the broken line shows the temperature characteristic of the conventional product, and C represented by the two-dot chain line shows the temperature characteristic of the oil damper.

As shown in FIG. 4, although the temperature characteristic C of the oil damper has a comparatively constant torque variation rate from room temperature (about 25° C.) to about 40° C., which is an ordinary usage environment temperature range, when the temperature rises to 40° C. or higher, the torque variation rate suddenly falls. This is considered to be due to the viscosity of the silicon oil falling rapidly as a result of the rise in the usage environment temperature.

On the other hand, although the temperature characteristic B of the conventional product has a comparatively constant torque variation rate from room temperature (about 25° C.) to about 40° C., when the temperature rises to 40° C. or higher, the torque variation rate falls. This is considered to be due particularly to the hardness of the ring member softening so as to decrease the frictional force between the ring member and the sliding portion decreasing, and the internal pressure of the ring portion not increasing due to the air leakage, and so as a result the generated torque decreases.

In contrast, the temperature characteristic A of the present product has a comparatively constant torque variation rate from room temperature (about 25° C.) to about 40° C., and even when the temperature rises to 40° C. or higher, the torque variation rate remains nearly constant. This is considered to be an effect due to suppressing the air leakage from the hollow portion 8a and so increasing the internal pressure of the ring member 8 by providing the projected portion 6e and the pressing member 9a as described above.

EXAMPLE 2

Next, the respective speed characteristics (rotational speed dependencies) of a rotary damper (the present product) that is the same as that used in Example 1 and a conventional rotary damper (conventional product) that is the same as that used in Example 1 were investigated. The obtained results are presented in FIG. 5.

Figure 5:
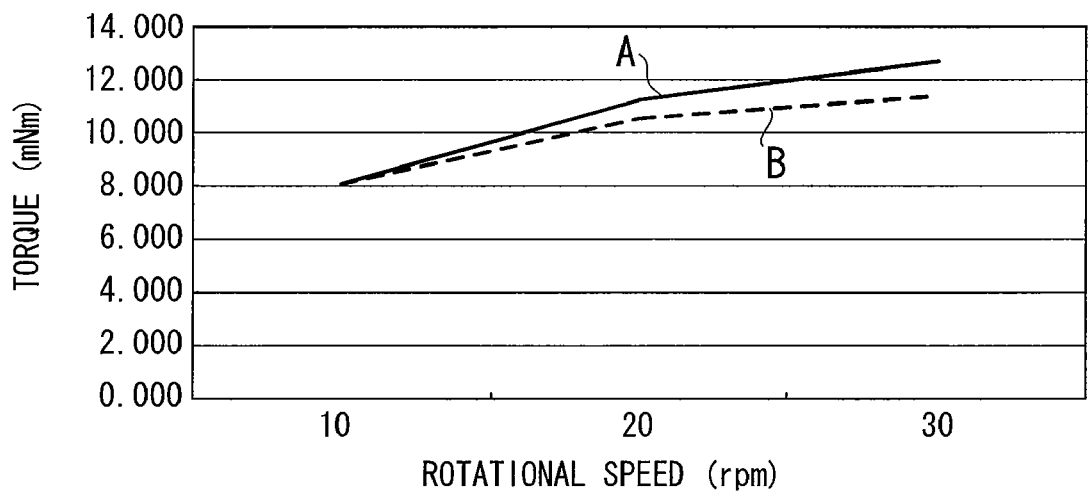
FIG. 5 is a graph that shows speed characteristics (rotational speed dependencies).

Note that, in FIG. 5, the horizontal axis denotes rotational speed, and the vertical axis denotes a torque value. Also, in FIG. 5, A represented by the solid line shows the speed characteristic of the present product, and B represented by the broken line shows the speed characteristic of the conventional product.

As shown in FIG. 5, in the speed characteristic B of the conventional product, in the range of 10 rpm to 30 rpm which is the ordinary usage rotational speed range, particularly when the rotational speed becomes 20 rpm or higher, the degree of rise in the torque value falls. This is considered to be due to the fact that, as the rotational speed increases, the ring member turns (rotates) by co-rotating with the rotation (sliding) of the sliding portion.

In contrast to this, in the speed characteristic A of the present product, the rotational speed dependency is high as a whole, and even when the rotational speed becomes 20 rpm or higher, the degree of rise of the torque value is maintained comparatively high. This is considered to be an effect due to suppressing the co-rotation of the ring member 8 by providing the projected portion 6e and the pressing member 9a as described above.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A rotary damper comprising:
a housing;
an annular ring member that is provided in the housing, and wherein the annular ring member is made of elastomer or flexible rubber;
a shaft body that is accommodated in a rotatable manner in the housing; and
a sliding portion attached to the shaft body, wherein the sliding portion is provided in the housing and makes contact with the ring member so as to slide with respect to the annular ring member along a circumferential direction of the annular ring member, wherein:
the annular ring member has an abutting portion that abuts the sliding portion, and forms a hollow portion provided inside the annular ring member;
the annular ring member has an opening portion on the side opposite to the abutting portion;
a projected portion is provided on an inner surface of the housing;
the opening portion engages opposite sides of the projected portion such that a gas is hermetically sealed in the hollow portion by the annular ring member and the projected portion; and
at least one pressing member presses the ring member toward the inner surface of the housing, wherein the at least one pressing member is provided on an inner side and/or an outer side of the annular ring member in a radial direction of the annular ring member.

2. The rotary damper according to claim 1, wherein the at least one pressing member includes a first pressing member provided on the inner side of the annular ring member in the radial direction of the annular ring member and a second pressing member provided on the outer side of the annular ring member in the radial direction of the annular ring member.

3. The rotary damper according to claim 1, wherein a portion of the shaft body projects from the housing.

4. The rotary damper according to claim 1, wherein the sliding portion is formed in an annular shape or a disc shape so as to abut the abutting portion of the annular ring member along an entire circumference of the annular ring member.

5. The rotary damper according to claim 1, wherein: the sliding portion is formed in a disc shape so as to abut the abutting portion of the annular ring member along an entire circumference of the annular ring member, and the sliding portion is integrally formed with the shaft body; and on a side of the annular ring member opposite to a side of the abutting portion of the annular ring member, the annular ring member abuts an inner surface of the housing in a slidable and air-tight manner, and a space within the housing defined by the sliding portion, the housing, and the annular ring member is constituted in an airtight manner by the sliding portion and the housing.

* * * * *